United States Patent
Kolsky et al.

(10) Patent No.: US 10,079,506 B2
(45) Date of Patent: Sep. 18, 2018

(54) SYSTEM AND METHOD FOR DISTRIBUTION OF ELECTRICAL POWER AND CONTROL DATA IN TEMPORARY LIGHTING INSTALLATIONS

(71) Applicant: PHILIPS LIGHTING HOLDING B.V., Eindhoven (NL)

(72) Inventors: Bradford Thomas Kolsky, Wakefield, MA (US); Jonathan Shai Seidmann, Brookline, MA (US); Kenneth Bruns, Townsend, MA (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 339 days.

(21) Appl. No.: 14/761,653

(22) PCT Filed: Jan. 15, 2014

(86) PCT No.: PCT/IB2014/058276
§ 371 (c)(1),
(2) Date: Jul. 17, 2015

(87) PCT Pub. No.: WO2014/111850
PCT Pub. Date: Jul. 24, 2014

(65) Prior Publication Data
US 2015/0357866 A1    Dec. 10, 2015

Related U.S. Application Data

(60) Provisional application No. 61/754,088, filed on Jan. 18, 2013.

(51) Int. Cl.
*H02J 13/00* (2006.01)
*H04B 3/54* (2006.01)
(Continued)

(52) U.S. Cl.
CPC ............ *H02J 13/0006* (2013.01); *H04B 3/54* (2013.01); *H04B 3/56* (2013.01); *H05B 37/0263* (2013.01)

(58) Field of Classification Search
CPC .......... H02J 13/0006; H04B 3/54; H04B 3/56
(Continued)

(56) References Cited

U.S. PATENT DOCUMENTS

| | | | |
|---|---|---|---|
| 9,059,776 B1 * | 6/2015 | Jimenez de Parga | ... H04B 3/30 |
| 2003/0222603 A1 | 12/2003 | Mogilner et al. | |
| 2010/0052429 A1 * | 3/2010 | Nethery, III | ........... H02H 3/003 307/85 |

(Continued)

FOREIGN PATENT DOCUMENTS

| | | |
|---|---|---|
| JP | H08223092 A | 8/1996 |
| JP | 2002164822 A | 6/2002 |

(Continued)

OTHER PUBLICATIONS

Philips, Color Kinetics, IntelliPower, available at http://colorkinetics.com/IntelliPower/.

*Primary Examiner* — Adi Amrany
(74) *Attorney, Agent, or Firm* — Akarsh P. Belagodu

(57) ABSTRACT

An AC circuit PLC injection module of a PLC-enabled power and data distribution system (300) includes: an AC power input (307) to receive an AC power signal; a PLC transceiver circuit (430/440) to couple a PLC signal onto the AC power signal; an AC circuit (411) to supply the AC power and the PLC signal; and a PLC blocking line filter (450) to filter the PLC signal from passing to the AC power input. An associated method for a system having plural PLC transmitters connected to plural PLC enabled devices via plural AC circuits each associated with one of the PLC transmitters, includes: setting PLC network IDs for each of the PLC enabled devices to a default PLC network ID, and then assigning each of the PLC enabled devices connected (Continued)

FIG. 8-II to each of the PLC transmitters to a PLC network ID uniquely assigned that PLC transmitter.

15 Claims, 11 Drawing Sheets

(51) Int. Cl.
*H04B 3/56* (2006.01)
*H05B 37/02* (2006.01)

(58) Field of Classification Search
USPC .............................................. 307/2, 112, 116
See application file for complete search history.

(56) References Cited

U.S. PATENT DOCUMENTS

| | | | |
|---|---|---|---|
| 2010/0204850 A1* | 8/2010 | Henderieckx .......... | H04B 3/542 700/297 |
| 2011/0125432 A1* | 5/2011 | Pomerantz ........... | G05B 19/058 702/62 |
| 2012/0059530 A1 | 3/2012 | Luo et al. | |
| 2012/0086561 A1 | 4/2012 | Ilyes et al. | |
| 2014/0092943 A1* | 4/2014 | Hariz ...................... | H04B 3/54 375/211 |

FOREIGN PATENT DOCUMENTS

| | | | |
|---|---|---|---|
| JP | 2003347975 A | | 12/2003 |
| JP | 2004104338 A | | 4/2004 |
| JP | 2009141800 A | * | 6/2009 |

* cited by examiner

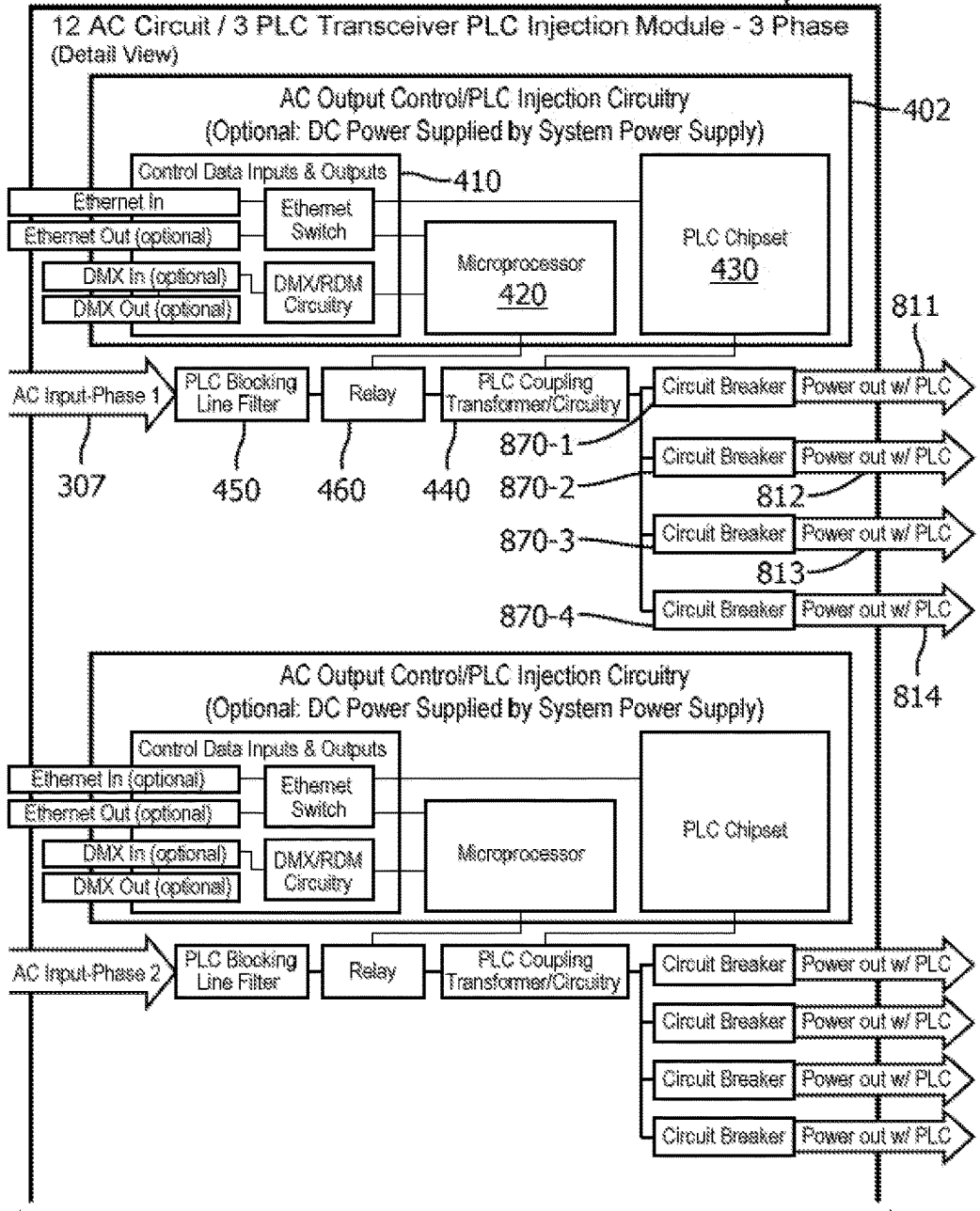
FIG. 8-I

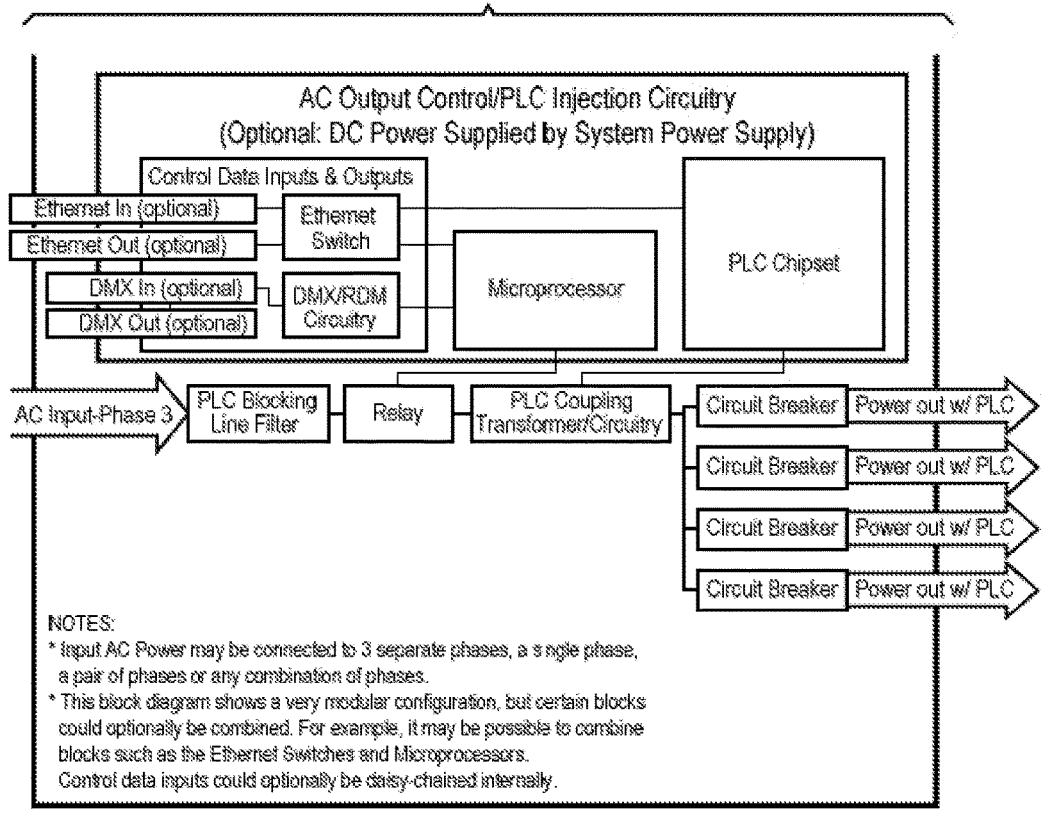
FIG. 8-II

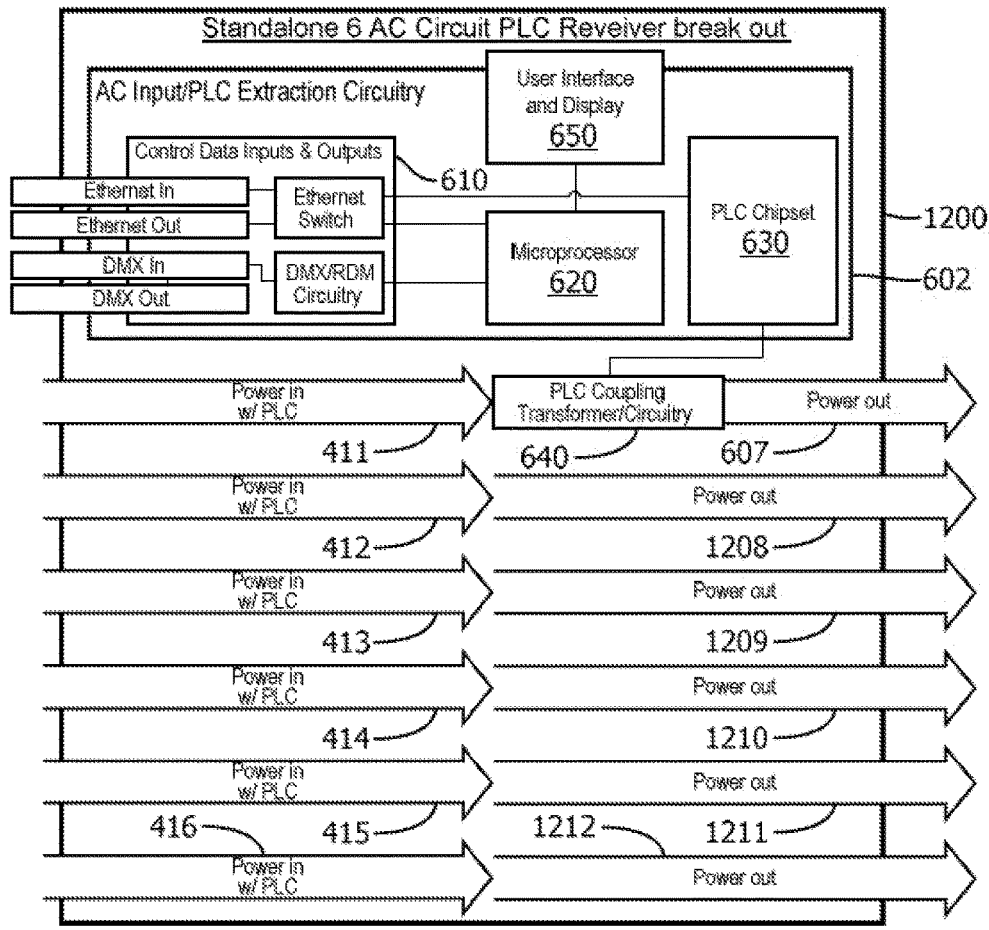
FIG. 12
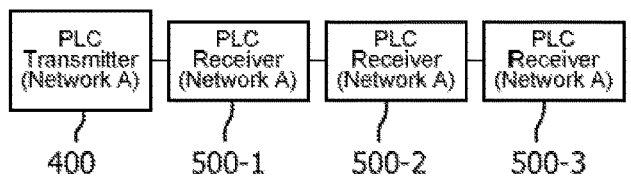
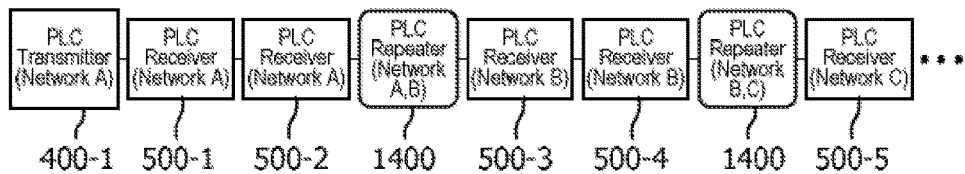
FIG. 13

SYSTEM AND METHOD FOR DISTRIBUTION OF ELECTRICAL POWER AND CONTROL DATA IN TEMPORARY LIGHTING INSTALLATIONS

CROSS-REFERENCE TO PRIOR APPLICATIONS

This application is the U.S. National Phase application under 35 U.S.C. § 371 of International Application No. PCT/IB2014/058276, filed on Jan. 15, 2014, which claims the benefit of U.S. Provisional Patent Application No. 61/754,088, filed on Jan. 18, 2013. These applications are hereby incorporated by reference herein.

TECHNICAL FIELD

The present invention is directed generally to power line communication in lighting installations requiring temporary power and data distribution, such as those common in, for example, entertainment, theatrical, and event lighting applications, employing existing power cable infrastructure.

BACKGROUND

Temporary lighting applications, such theatrical or event lighting, often involve the use of temporary power distribution systems in order to distribute power from a central location to where it is needed. These distribution systems often feature a single set of high-current 3-phase AC input connections, such as, for example: 400 A, 120/208 VAC, 3 Phase, and many low-power, e.g. 20 A, single phase output connections. Often, multiple individual circuits are bundled together into a single multi-cable configuration in order facilitate the cabling of multiple parallel connections.

FIG. 1 illustrates an example of a power distribution rack 100 having a plurality of power output connectors 110. FIG. 2 illustrates an example of a 6-circuit multi-cable 200 which may be employed with power distribution rack 100.

Intelligently-controllable lighting equipment is commonly controlled by the industry-standard DMX512-A control protocol or by one of several Ethernet protocols. For most types of equipment and applications, power and data wires must be run separately. Compared to power cables, data cables tend to be relatively delicate and must be handled with greater care.

The computer networking industry has developed ways to transmit Ethernet data over AC power lines. Such power line communication (PLC) works reasonably well for residential computer networking.

While conventional PLC technologies offer robust performance allowing PLC data to propagate through an electrical panel from one circuit to another, this does not always happen reliably and depends on the size and complexity of the electrical system, the devices connected to the system, the routing of the wiring, and environmental conditions.

The PLC-based approach has recently been deployed to enable digitally controllable LED lighting solutions using existing electrical infrastructures for small and medium lighting networks, as described at http://colorkinetics.com/IntelliPower/, incorporated herein by reference. However, for control of larger lighting systems, particularly those set up temporarily for entertainment, theatrical, and event lighting applications, special care must be taken to ensure functional/reliable operation and scalability, because a single PLC network is limited in bandwidth and may not have enough capacity to reliably control a large lighting system.

Further, the size and complexity of power distribution systems varies greatly from application to application. A single PLC transmitter may not have adequate signal strength to reach every PLC node in many systems. PLC transmitters are also limited in the number of nodes they can communicate with and the bandwidth they can support.

PLC data or signals are capable of coupling or "jumping" from one AC circuit to another [electrically isolated] AC circuit when cables are run in close proximity to each other (such as would be the case in multi-circuit multi-cables or any cables that are routed in bundles). This could result in interference, unpredictable performance, and could make it difficult to identify the locations of different PLC enabled devices in the system (which would be problematic for system configuration).

When PLC enabled devices are installed in a new application, they will likely be configured with an unknown PLC Network ID. For security reasons, it may not be possible to change this network ID remotely without knowing what it is.

Much of the equipment in the entertainment/event lighting industry is owned by rental companies. This equipment is moved from job to job and typically must be re-configured for each application. In this context, it is important that the power distribution can be set up and taken down quickly, and that circuits operate with a very high reliability. Furthermore, these companies have a substantial investment in existing cables such as 6-circuit multi-cable 200 shown in FIG. 2, and it would be desirable to employ these same cables in a temporary lighting and multimedia installations which employ PLC enabled devices.

Thus, it would be desirable to enable expanding and configuring a PLC control system, particularly for temporary lighting and multimedia installations, in a way that increases bandwidth, reduces costs, and improves ease of installation, reliability and security.

SUMMARY

Generally, in various embodiments and implementations, one aspect of the invention may address the problem of system capacity by using multiple PLC transmitters with unique PLC network IDs, each strategically connected to a particular circuit or group of circuits. Each PLC transmitter may be assigned a unique PLC Network ID to allow PLC node quantity limits to be increased with each added PLC transmitter and to prevent multiple PLC enabled devices from transmitting the same data on the same network (which may cause functionality problems). A PLC blocking line filter may be installed in series with the input AC supply (input AC power connection) to block PLC signals from being coupled onto the power lines of other AC circuits (with other PLC networks) which may consume available bandwidth and limit the system's capacity.

Additionally, in some embodiments, power relays that may be used during system configuration to isolate the AC circuit(s) connected to each PLC transmitter (by switching off power to other AC circuits during the configuration process).

Lighting systems that make use of conventional lighting and dimmer racks could potentially save substantial amounts of AC power cable (as well as data cable) by using PLC-enabled single-channel dimmers located next to the lighting fixture. For example, independently controlling 4 575 watt ellipsoidal spot lights with a conventional dimmer rack dimming system would require cable to be run from the dimmer rack to the light fixtures for 4 separate circuits. Thus, it is beneficial to install a single-channel PLC-enabled dimmer next to each light fixture, enabling independent control of each of the 4 ellipsoidal lighting fixtures by running a single AC power circuit (instead of 4 circuits)

The approach disclosed herein is particularly suitable for any application that requires the use of a temporary power distribution system and control data. These temporary power distribution systems are common in industries needing substantial amounts of power in flexible configurations, e.g. entertainment/theatrical/event lighting applications.

Generally, in one aspect, the invention relates to a power distribution system with built-in PLC capabilities. The system includes one or more PLC receivers, and an AC circuit PLC Injector including a PLC transceiver circuit, optionally, at least one power relay, multiple PLC transmitters each with unique PLC network IDs and PLC-Blocking line filters. In another aspect, a method is provided for reducing the negative impact of crosstalk between parallel AC lines by easily configuring multiple independent PLC networks, each PLC transmitter in an installation being configured with a unique PLC network ID and each PLC receiver being configured with the same PLC network ID as the transmitter it is connected to.

In one aspect, a system comprises: at least one AC circuit power line communication (PLC) injection module, the AC circuit PLC injection module comprising: an AC power input configured to receive an AC power signal; a PLC transceiver circuit configured to couple a PLC signal onto the AC power signal; at least a first AC circuit output configured to output AC power and the PLC signal; and a PLC blocking line filter configured to filter the PLC signal from passing to the AC power input.

In one or more embodiments, the system further comprises a power relay connected between the AC power input and the at least one AC circuit output, wherein the power relay is configured to be controlled to selectively disable the first AC circuit output from outputting the AC power.

In some variations of these embodiments, at least one AC circuit PLC injection module comprises at least a second AC circuit output, each configured to output the AC power and the PLC signal, wherein the first and second AC circuit outputs are isolated from each other by at least one circuit breaker.

In one or more embodiments, at least one AC circuit PLC injection module further comprises: a second AC power input configured to receive the AC power signal; a second PLC transceiver circuit configured to couple a second PLC signal onto the AC power signal; at least a second AC circuit output configured to output AC power and the second PLC signal; and a second PLC blocking line filter configured to filter the second PLC signal from passing to the second AC power input.

In some variations of these embodiments, the first PLC transceiver circuit is configured to have a first PLC network ID, and the second PLC transceiver circuit is configured to have a second PLC network ID which is different from the first PLC network ID.

In one or more embodiments, at least one AC circuit PLC injection module further comprises: a second AC power input configured to receive a second AC power signal different from the first AC power signal; a second PLC transceiver circuit configured to couple a second PLC signal onto the second AC power signal; at least a second AC circuit output configured to output AC power and the second PLC signal; and a second PLC blocking line filter configured to filter the second PLC signal from passing to the second AC power input.

In one or more embodiments, at least one AC circuit PLC injection module includes at least a second AC circuit PLC injection module, wherein the second AC circuit PLC injection module comprises: a second AC power input configured to receive the AC power signal; a second PLC transceiver circuit configured to couple a second PLC signal onto the AC power signal; at least a second AC circuit output configured to output AC power and the second PLC signal; and a second PLC blocking line filter configured to filter the second PLC signal from passing to the second AC power input.

In some variations of these embodiments, the first PLC transceiver circuit is configured to have a first PLC network ID, and the second PLC transceiver circuit is configured to have a second PLC network ID which is different from the first PLC network ID.

In one or more embodiments, the system further comprises: at least a first PLC receiver connected to the first AC circuit output and configured to receive the PLC signal therefrom; and at least a second PLC receiver connected to the second AC circuit output and configured to receive the second PLC signal therefrom, wherein the a first PLC receiver is configured to have the first PLC network ID and the second PLC receiver is configured to have the second PLC network ID.

In one or more embodiments, the system further comprises: a PLC repeater connected between the first AC circuit output and a PLC receiver, wherein the PLC transceiver circuit is configured to have a first PLC network ID, wherein the PLC receiver is configured to have a second PLC network ID which is different from the first PLC network ID, and wherein PLC data is communicated between the PLC transceiver circuit and the PLC receiver via the PLC repeater.

In another aspect, a method is provided for configuring of PLC enabled devices connected to a PLC-enabled power and data distribution system having a plurality of PLC transmitters connected to the plurality of PLC enabled devices via a plurality of AC circuits each associated with one of the PLC transmitters. The method comprises: setting PLC network IDs for each of the plurality of PLC enabled devices to a default PLC network ID; and after each of the plurality of PLC enabled devices has been set to the default PLC network ID, assigning each of the plurality of PLC enabled devices connected to each one of the PLC transmitters to a PLC network ID uniquely assigned that one PLC transmitter.

In one or more embodiments, setting the PLC network IDs for each of the plurality of PLC enabled devices to the default network ID comprises: (1) configuring a selected one of the PLC transmitters to a have selected PLC network ID among a finite list of possible PLC network IDs employed by the PLC-enabled power and data distribution system; (2) discovering any PLC enabled devices connected to the selected PLC transmitter which are configured to the selected PLC network ID; (3) changing the PLC network IDs of any discovered PLC enabled devices to the default PLC network ID; and (4) repeating steps (1) through (3) for each PLC network ID among a finite list of possible PLC network IDs.

In some variations of these embodiments, assigning each of the plurality of PLC enabled devices connected to each one of the PLC transmitters to a PLC network ID uniquely assigned that one PLC transmitter comprises: turning OFF power to all AC circuits except those associated with a first PLC transmitter; configuring any PLC enabled devices that remain powered ON with a first unique PLC network ID; configuring the first PLC transmitter to have the first assigned PLC network ID.

In some variations of these embodiments, the method further comprises: turning OFF power to all AC circuits except those associated with the first PLC transmitter and a second PLC transmitter; configuring any PLC enabled devices that remain powered ON and have not been configured with a non-default PLC Network ID with a second unique PLC network ID; configuring the second PLC transmitter to have the second assigned PLC network ID.

In one or more embodiments, setting PLC network IDs for each of the plurality of PLC enabled devices to a default PLC network ID comprises each of the plurality of PLC enabled devices automatically setting its PLC network ID to the default PLC network ID when it does not receive any PLC signal a PLC transmitter within a predetermined period of time after it is powered up.

In some variations of these embodiments, assigning each of the plurality of PLC enabled devices connected to each one of the PLC transmitters to a PLC network ID uniquely assigned that one PLC transmitter comprises: the PLC-enabled power distribution system turning ON all AC circuits associated with each PLC transmitter sequentially, with a delay interval between switching ON AC circuit(s) associated with one PLC transmitter and switching ON the AC circuit(s) for a next PLC transmitter; tracking at the PLC-enabled power distribution system and at each of the PLC enabled devices a time which has elapsed since power was turned ON; transmitting one or more first broadcast PLC packets instructing all PLC enabled devices which have been ON for a first amount of time to change their PLC network ID to a first unique PLC network ID; transmitting one or more additional broadcast PLC packets instructing all enabled devices which have been ON for each of a plurality of additional different amounts of time to change their PLC network ID to a corresponding unique PLC network ID until each of the plurality of PLC enabled devices connected to each one of the PLC transmitters is assigned to a PLC network ID uniquely assigned that one PLC transmitter.

In one or more embodiments, setting PLC network IDs for each of the plurality of PLC enabled devices to a default PLC network ID comprises one of the PLC transmitters broadcasting a global command capable of being received by all of the PLC enabled devices, regardless of their assigned PLC network ID, wherein the global command instructs all of the PLC enabled devices to reset their PLC network IDs to the default PLC network ID The present disclosure will occasionally refer to PLC transmitters and PLC receivers. This should be considered the typical function of these devices during normal operation. In fact, the PLC transmitters and PLC receivers may be more accurately referred to as PLC transceivers as each may be fully capable of both transmitting and receiving data.

Systems and methods disclosed herein may be useful for any application that requires the use of a temporary power distribution system and control data. These temporary power distribution systems are common in industries needing substantial amounts of power in flexible configurations.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources such as one or more strings of LEDs as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices may be coupled to some network and each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 8, divided into FIGS. 8-I and 8-II, illustrates an example embodiment of a 12 AC circuit PLC injector with 3 PLC transmitters and support for up to 3 phase operation which may be employed in a PLC-enabled power distribution system shown in FIG. 7.

FIG. 12 illustrates a 6 AC circuit PLC receiver breakout with 1 PLC receiver.

FIG. 13 illustrates an exemplary configuration of PLC repeaters at a system level.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Many embodiments of this invention relate to a PLC-enabled power distribution system (sometimes referred to as a power distribution rack) which includes PLC transmitters, and which is connected to PLC receivers and/or PLC receiver modules that are either standalone products or integrated into other equipment or lighting fixtures, and various processes to improve system performance/scalability/usability.

Figure 1:
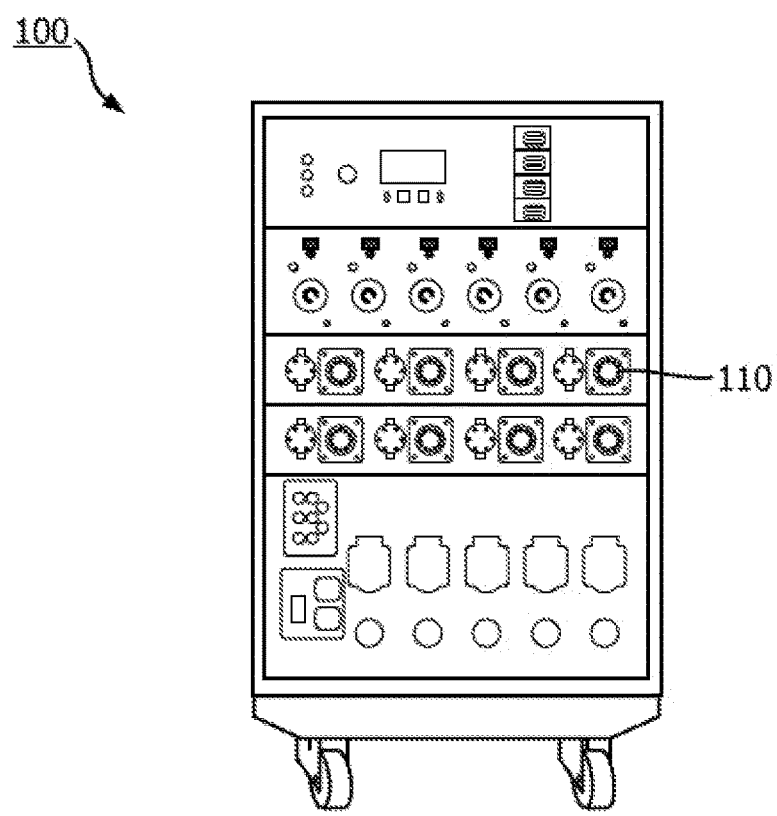
FIG. 1 illustrates a conventional power distribution rack used in entertainment industry.
Figure 2:
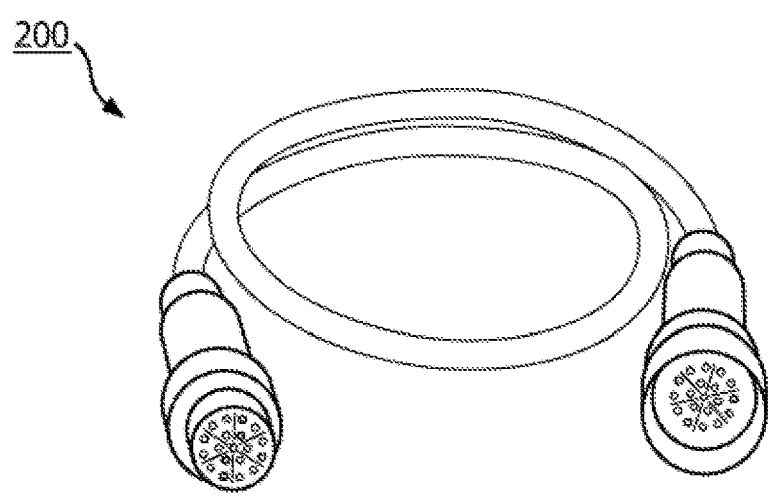
FIG. 2 illustrates a conventional 6-circuit cable, often used in conjunction with the power distribution rack shown in FIG. 1.
Figure 3:
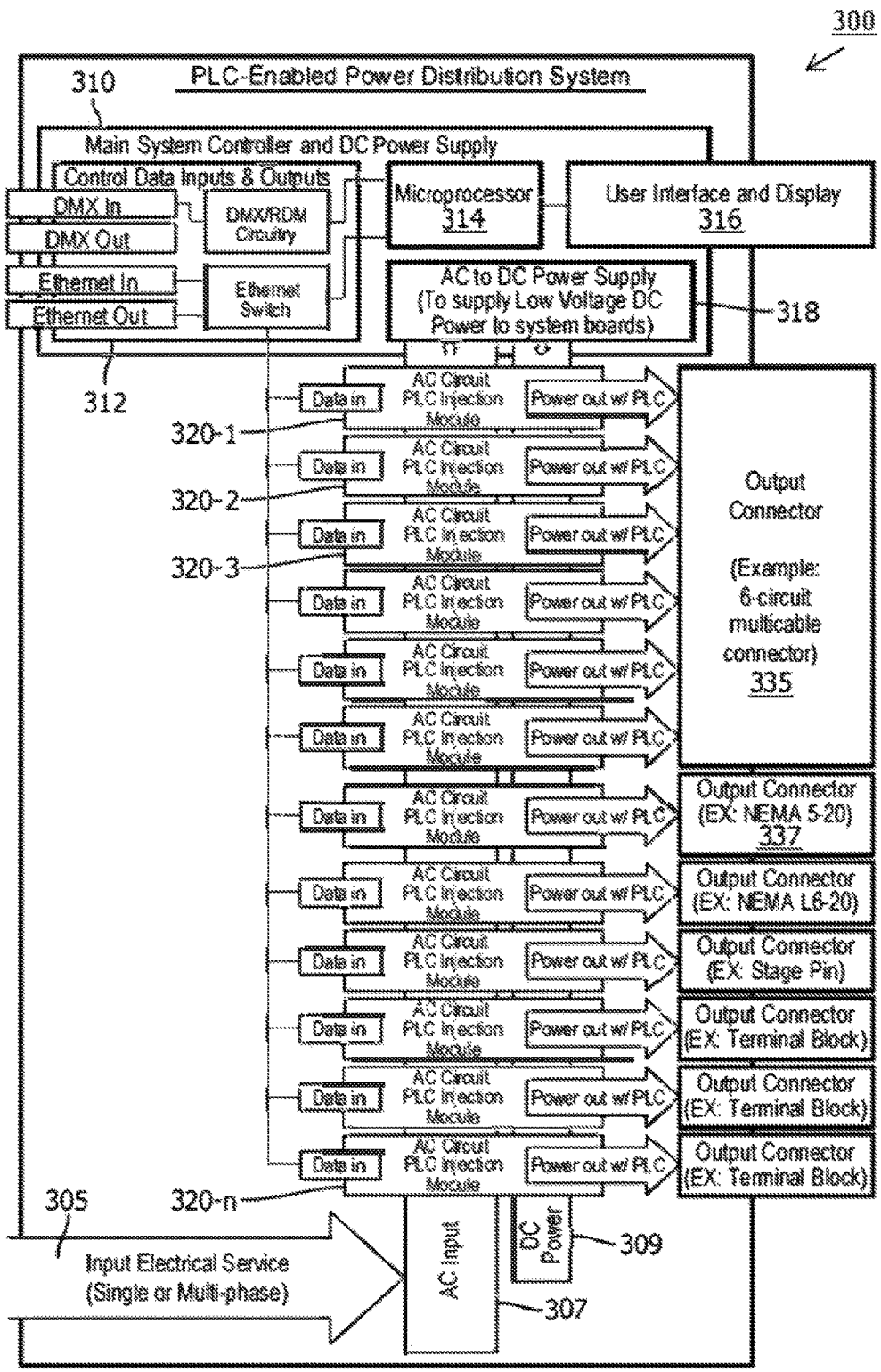
FIG. 3 illustrates an example embodiment of a PLC-enabled power distribution system.

FIG. 3 illustrates an example embodiment of a PLC-enabled power distribution system 300. PLC-enabled power distribution system 300 includes: a main system controller and DC power supply 310; a plurality of Single AC Circuit PLC Injection Modules 320-1, 320-2, . . . 320-n; a 6-circuit output connector 335; and a plurality of additional individual output connectors 337, which may include one or more of: a NEMA 5-20 connector, a NEMA L6-20 connector, a Stage Pin connector, a connector which may be terminated by a terminal block, etc. In some embodiments, all of these components of PLC-enabled power distribution system 300 may be mounted in the same cabinet or rack.

Main system controller and DC power supply 310 includes data input/output connection(s) 312, a microprocessor 314, a user interface (UI) 316, and an AC-to-DC power converter 318. Data input/output connection(s) 312 may include one of more DMX input/output connections and/or one or more Ethernet input/output connections by means of which data (e.g., control data for controlling an operation of PLC-enabled power distribution system 300) may be communicated between PLC-enabled power distribution system 300 (and one or more PLC-enabled devices connected to PLC-enabled power distribution system 300) and any external device, such as a computer, controller, server, etc., for example through an external communication network. User interface 316 may include a display and/or various controls to allow a user or operator to interact with (e.g., configure) PLC-enabled power distribution system 300.

In operation, PLC-enabled power distribution system 300 receives an input electrical service (single or multi-phase AC power) via input 305 and supplies an AC voltage via an AC power input 307 connected to AC-to-DC power converter 318 and each of Single AC Circuit PLC Injection Modules 320-1, 320-2, . . . 320-n. AC-to-DC power converter 318 converts this AC voltage into one or more DC voltages which it supplies to each of Single AC Circuit PLC Injection Modules 320-1, 320-2, . . . 320-n via one or more DC voltage supply lines 309.

In PLC-enabled power distribution system 300, each Single AC Circuit PLC injection module comprises one PLC transmitter for communicating PLC data with one AC circuit. Again, as noted above, although Single AC Circuit PLC injection module is being described here as including a PLC transmitter to denote its primary functionality in normal operation, in general the PLC transmitter may be a PLC transceiver which is capable or transmitting and receiving PLC data.

Figure 4:
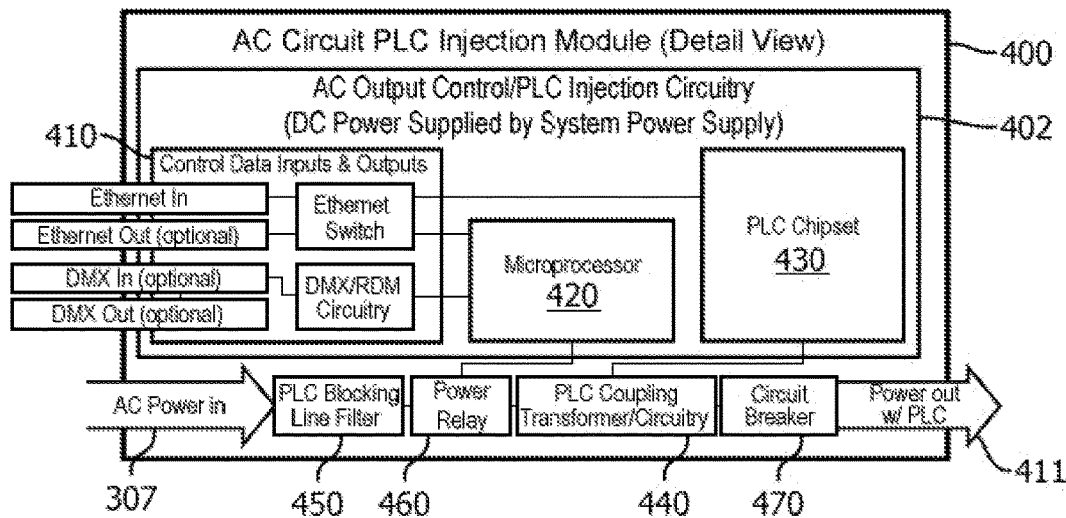
FIG. 4 illustrates an example embodiment of a single AC circuit PLC injection module for use in a PLC-enabled power distribution system.

FIG. 4 illustrates an example embodiment of a Single AC Circuit PLC injection module 400 for use in a PLC-enabled power distribution system, such as PLC-enabled power distribution system 300. Single AC circuit PLC injection module 400 may be one embodiment of Single AC Circuit PLC Injection Modules 320-1, 320-2, . . . 320-n of PLC-enabled power distribution system 300.

Single AC circuit PLC injection module 400 includes AC output control/PLC injection circuitry 402, which in turn includes data input/output connection(s) 410, a microprocessor 420, and a PLC chipset 430. Single AC circuit PLC injection module 400 further includes PLC coupling transformer/circuitry 440, a PLC blocking line filter 450, a power relay 460, and a circuit breaker 470. The circuit breaker 470 may be required for safety or desired for convenience, but is not a critical element of this invention. Single AC Circuit PLC injection module 400 comprises one PLC transmitter (e.g., AC output control/PLC injection circuitry 402, PLC coupling transformer/circuitry 440, PLC blocking line filter 450, and power relay 460) for communicating PLC data with one AC circuit 411, Again, as noted above, although being referred to here as a PLC transmitter to denote its primary functionality in normal operation, in general the PLC transmitter may be a PLC transceiver which is capable or transmitting and receiving PLC data.

Data input/output connection(s) 410 may include one of more DMX input/output connections and/or one or more Ethernet input/output connections by means of which data (e.g., control data for controlling an operation of Single AC Circuit PLC injection module 400) may be communicated between Single AC Circuit PLC injection module 400 (and one or more PLC-enabled devices connected to PLC-enabled power distribution system 300) and any external device, such as a computer, controller, server, etc., for example through data input/output connection(s) 312 of PLC-enabled power distribution system 300.

In operation, Single AC Circuit PLC injection module 400 receives and/or outputs data via data input/output connection(s) 410, and couples the data to and/or from an AC circuit 411 with PLC data. Further details of the operation of Single AC Circuit PLC injection module 400 will be described below.

Together, PLC chipset 430 and PLC coupling transformer/circuitry 440 may be referred to as a PLC transceiver circuit.

PLC chipset 430 may comprise an off-the-shelf (OTS) chipset available commercially for interfacing data to and/or from AC circuit 411 via PLC coupling transformer/circuitry 440. PLC chipset 430 may be configured to operate with an assigned unique PLC network ID/security ID or code so that it only exchanges PLC data with other PLC-enabled devices which share that unique PLC network ID/security code.

PLC coupling transformer/circuitry 440 is coupled via PLC blocking line filter 450 and (optionally) power relay 460 to AC power input 307 which supplies the AC power for AC circuit 411, and couples PLC data to and/or from AC circuit 411 under control of PLC chipset 430. PLC coupling transformer/circuitry 440 is a common component of a PLC-enabled device which is understood in the industry, and accordingly further details thereof will not be described.

PLC blocking line filter 450 filters or blocks the PLC data which rides on the AC circuit 411 from passing therethrough to AC power input 307. In general, the PLC data on AC circuit 411 is communicated at a significantly higher frequency than the AC electrical power, which is typically 50 Hz or 60 Hz. In that case, in some embodiments PLC blocking line filter 450 filter may comprise a low-pass filter. Beneficially, PLC blocking line filter 450 may filter out PLC data which placed onto AC circuit 411 by Single AC circuit PLC injection module 400 and/or another PLC-enabled device connected to AC circuit 411, from passing back onto AC power input 307. Beneficially, PLC blocking line filter 450 may also filter any residual PLC data which has been coupled onto AC power input 307 from another PLC injection module to which AC power input 307 is connected, from being further coupled to Single AC circuit PLC injection module 400 and AC circuit 411. That is, in operation, Single AC circuit PLC injection module 400 injects PLC data onto AC power line 307 and is capable of both transmitting and receiving PLC data. PLC blocking line filter inhibits or prevents the PLC data from propagating to other AC circuits which are supplied by AC power input 307 and potentially causing interference, reduced available bandwidth, and/or unreliable operation. It should be understood of course that PLC blocking line filter 450 is not an ideal component, and accordingly although it filters or attenuates the level of PLC data or PLC signals passing therethrough, for example by a specified attenuation factor (e.g., in dB), in general it may not completely block some residual component of the PLC data or PLC signals from passing therethrough.

Power relay 460 allows AC circuit 411 to be switched on and off under control of microprocessor 420. Power relay 460 can be used for general power switching, but can also be used during system setup and configuration as will be described in more detail below. Power relay 460 is beneficial for certain implementations of advanced/specialized features/procedures described herein (such as certain implementations of an automated discovery feature), but it is not required for all embodiments. Accordingly, power relay 460 may be omitted in some embodiments of Single AC Circuit PLC injection module 400.

Circuit breaker 470 is a conventional component that may be required in electrical power distribution systems for safety and code requirements, and accordingly further details thereof will not be described.

Figure 5:
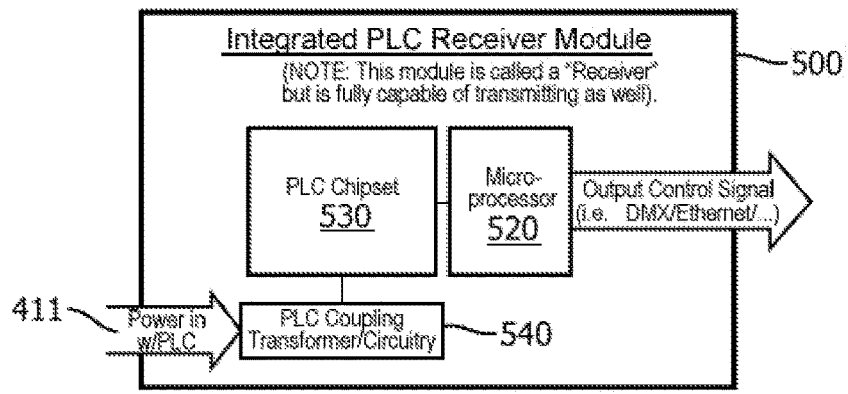
FIG. 5 illustrates an example of a PLC receiver that could be integrated directly into another product.

FIG. 5 illustrates an example of an integrated PLC receiver module 500 which could be integrated directly into another product or component, such as a lighting element, dimmer, audio component, etc. PLC receiver module 500 can be connected to an AC circuit 411 with PLC which may be supplied, for example, by PLC-enabled power distribution system 300.

PLC receiver module 500 includes a microprocessor 520, PLC chipset 530, and PLC coupling transformer/circuitry 540.

PLC chipset 530 may comprise an off-the-shelf (OTS) chipset available commercially for interfacing data to and/or from AC circuit 411 via PLC coupling transformer/circuitry 540. PLC chipset 530 may be configured to operate with an assigned unique PLC network ID/security ID or code so that it only exchanges PLC data with other PLC-enabled devices which share that unique PLC network ID/security code.

PLC coupling transformer/circuitry 540 is coupled to AC circuit 411, and couples PLC data to and/or from AC circuit 411 under control of PLC chipset 530. PLC coupling transformer/circuitry 540 is a common component of a PLC-enabled device which is understood in the industry, and accordingly further details thereof will not be described.

Microprocessor 520 may exchange data (e.g., control data) with the product or component with which it is associated. For example, microprocessor 520 may supply control data received via AC circuit 411 with PLC to a lighting element with which it is associated so as to control one or more parameters such as intensity, dimming level, color, blinking, etc. of the lighting element. As noted above, although PLC receiver module 500 in reference to its primary operating mode, it should be understood that PLC receiver module 500 may also transmit data via PLC coupling transformer/circuitry 540 onto AC circuit 411 with PLC.

DC power for various components of PLC receiver module 500 may be supplied in various embodiments by an AC/DC converter (not shown), by an external product or component associated with PLC receiver module 500, or PLC chipset 530.

Figure 6:
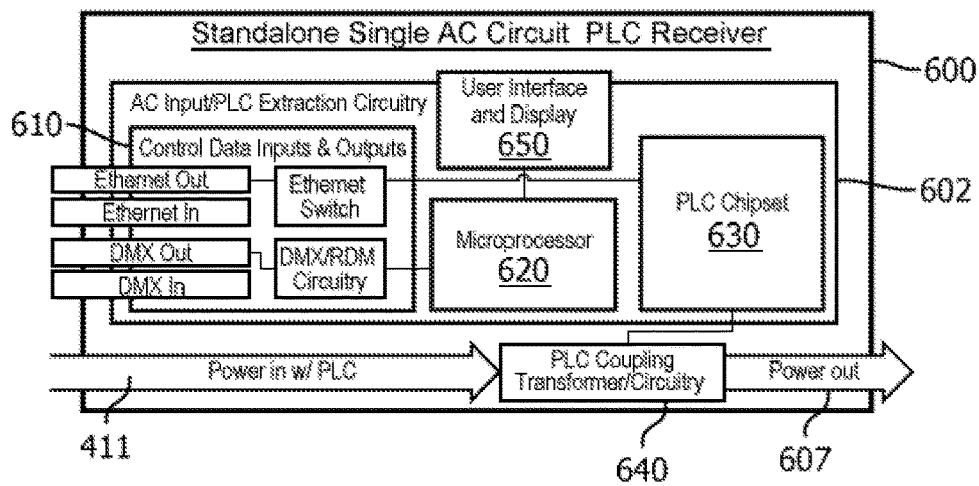
FIG. 6 illustrates an example of a single-circuit standalone PLC receiver with Ethernet and/or DMX data outputs for use with equipment that does not feature integrated PLC receiver modules.

FIG. 6 illustrates an example of a standalone single-circuit PLC receiver 600 with Ethernet and/or DMX data outputs for use with equipment that does not feature integrated any PLC receiver modules. PLC receiver 600 can be connected to an AC circuit 411 with PLC which may be supplied, for example, by PLC-enabled power distribution system 300.

PLC receiver 600 includes AC Input/PLC extraction circuitry 602 and a PLC coupling transformer/circuitry 640. AC Input/PLC extraction circuitry 602 includes data input/output connection(s) 610, a microprocessor 620, a PLC chipset 630, and a user interface 650.

Data input/output connection(s) 610 may include one of more DMX input/output connections and/or one or more Ethernet input/output connections by means of which data (e.g., control data for controlling an operation of an external device) may be communicated between PLC receiver 600 (and thereby perhaps a PLC injection module 400 to which it is connected) and any external device, such as a lighting element, dimmer, audio component, etc.

PLC chipset 630 may comprise an off-the-shelf (OTS) chipset available commercially for interfacing data to and/or from AC circuit 411 via PLC coupling transformer/circuitry 640. PLC chipset 630 may be configured to operate with an assigned unique PLC network ID/security ID or code so that it only exchanges PLC data with other PLC-enabled devices which share that unique PLC network ID/security code.

PLC coupling transformer/circuitry 640 is coupled to AC circuit 411, and couples PLC data to and/or from AC circuit 411 under control of PLC chipset 630. PLC coupling transformer/circuitry 640 is a common component of a PLC-enabled device which is understood in the industry, and accordingly further details thereof will not be described.

User interface 650 may include a display and/or various controls to allow a user or operator to interact with (e.g., configure) PLC receiver 600.

DC power for various components of PLC receiver 600 may be supplied in various embodiments by an AC/DC converter (not shown), by an external product or component associated with PLC receiver 600, or PLC chipset 630.

Figure 7:
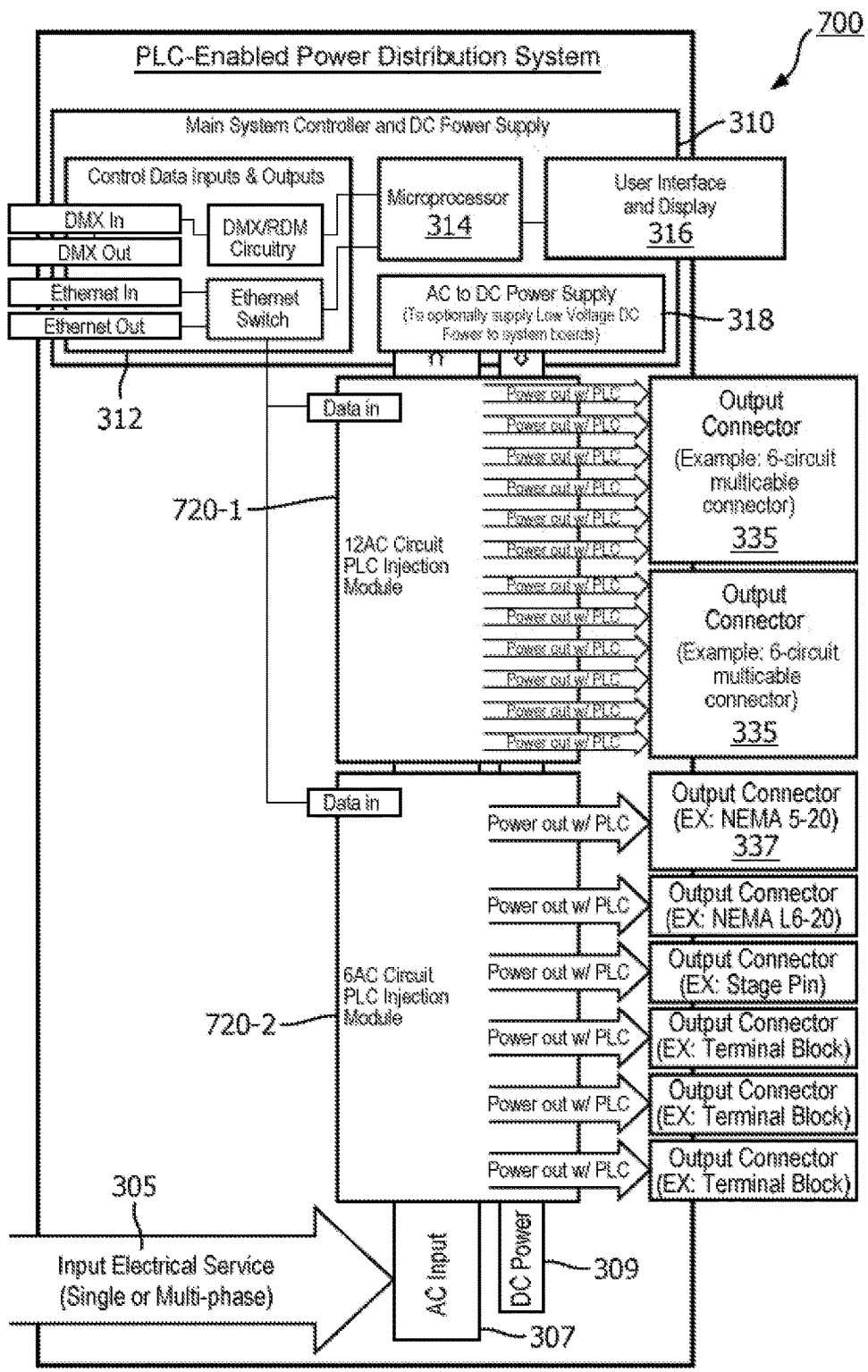
FIG. 7 illustrates another example embodiment of a PLC-enabled power distribution system for typical applications where PLC transmitters are shared across multiple AC circuits.

FIG. 7 illustrates another embodiment of a PLC-enabled power distribution system 700. Like numbered elements in FIG. 7 may be the same as those in FIG. 3 and so a repeated description thereof will be omitted. In some embodiments, PLC-enabled power distribution system 700 may be mounted in a single cabinet or rack.

PLC-enabled power distribution system 700 includes a 12-AC Circuit PLC Injection Module 720-1 and a 6-AC Circuit PLC Injection Module 720-2. 12-AC Circuit PLC Injection Module 720-1 is shared by 12 AC circuits, while 6-AC Circuit PLC Injection Module 720-2 is shared by 6 AC circuits. Embodiments of 12-AC Circuit PLC Injection Module 720-1 and a 6-AC Circuit PLC Injection Module 720-2 will be described below with respect to FIGS. 8 and 9 wherein PLC transmitters are shared across multiple AC circuits. Sharing PLC transmitters across multiple AC circuits is a good way to reduce system cost when maximum possible bandwidth is not required.

In some embodiments, PLC-enabled power distribution system 700 supports 3-phase operation. PLC signals may or may not reliably be coupled from one phase to another in a 3-phase electrical system. For this reason, beneficially, PLC transmitters that are shared across multiple AC circuits in PLC-enabled power distribution system 700 may be configured so that all AC circuits connected to a particular PLC transmitter are connected to the same phase (or pair/group of phases if the branch circuits are comprised of multiple phases).

FIG. 8, divided into FIGS. 8-I and 8-II, illustrates an example embodiment of a 12 AC circuit PLC injector 800 with three PLC transmitters and support for up to 3 phase operation which may be employed in PLC-enabled power distribution system 700 shown in FIG. 7. In particular, a 12 AC circuit PLC injector 800 illustrates three identical PLC transmitters, each comprising AC output control/PLC injection circuitry 402, PLC coupling transformer/circuitry 440, PLC blocking line filter 450, and power relay 460, for communicating PLC data with four corresponding AC circuits, for example AC circuits 811, 812, 813, and 814 which each include a corresponding circuit breaker, e.g., circuit breakers 870-1, 870-2, 870-3 and 870-4. Each of these components has been described above with respect to FIG. 4 and so a description thereof will not be repeated. In 12 AC circuit PLC injector 800, each of the three PLC transmitters is connected to a corresponding one of the 3 phases of an input electrical circuit to which 12 AC circuit PLC injector 800 is connected.

Although FIG. 8 illustrates an arrangement for 3 phase AC power, it should be understood that in other embodiments one a single phase, or a pair of phases, or any combination of phases may be employed for the three PLC transmitters. Furthermore, although 12 AC circuit PLC injector 800 illustrates a modular configuration of three separate PLC transmitters, in other embodiments some components such as data input/output connection(s) 410 and/or microprocessor 420 may be shared or combined among the PLC transmitters. However in general, each PLC transmitter may have its own PLC chipset 430, PLC coupling transformer/circuitry 440, PLC blocking line filter 450, and power relay 460.

Figure 9:
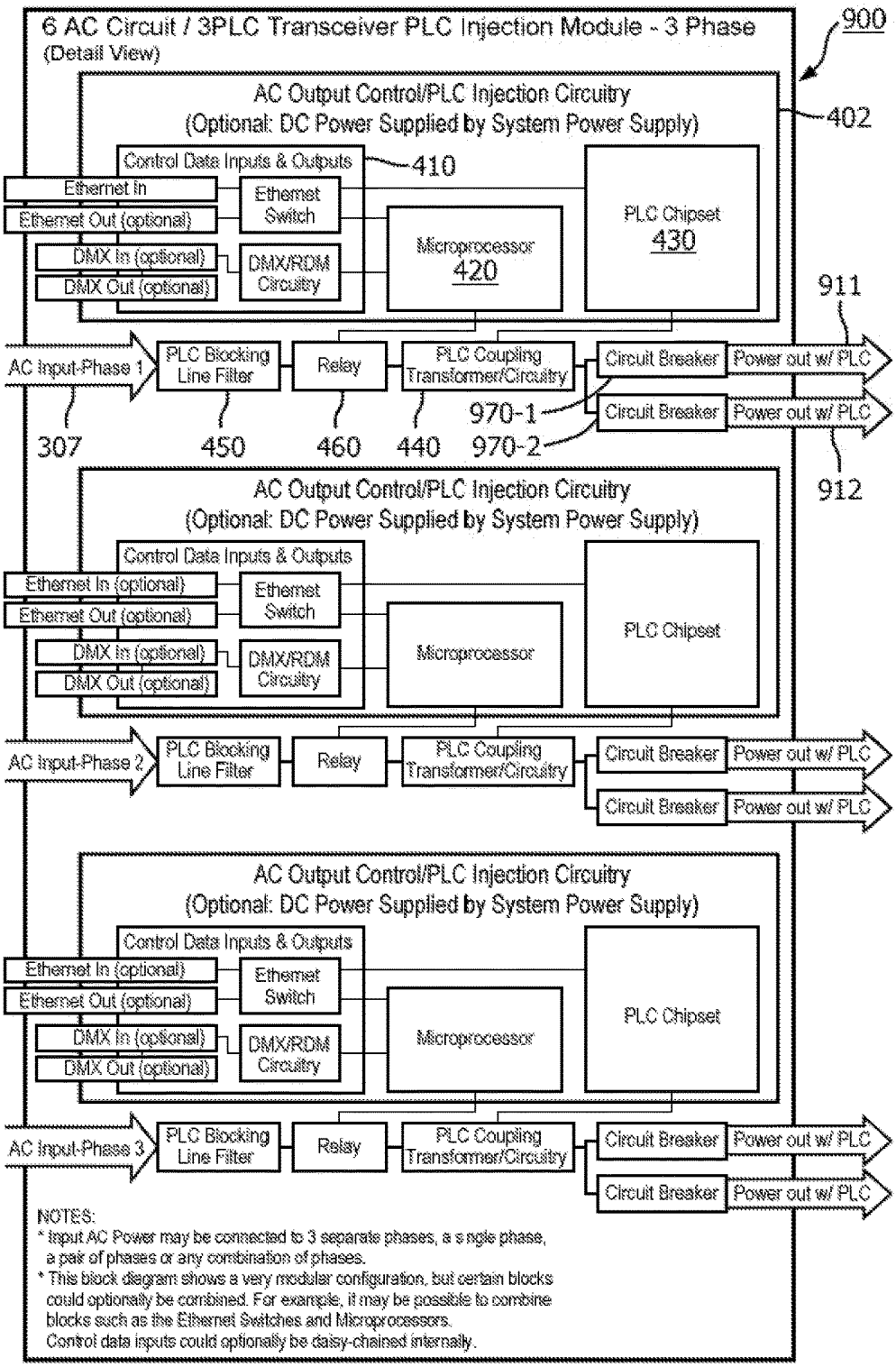
FIG. 9 illustrates an example embodiment of a 6 AC circuit PLC injector with 3 PLC transmitters and support for up to 3 phase operation which may be employed in a PLC-enabled power distribution system shown in FIG. 7.

FIG. 9 illustrates an example embodiment of a 6 AC circuit PLC injector 900 with 3 PLC transmitters and support for up to 3 phase operation which may be employed in PLC-enabled power distribution system 700 shown in FIG. 7. 6 AC circuit PLC injector 900 is similar to 12 AC circuit PLC injector 800 illustrated in FIG. 8 and described above, with a primary difference being that each of the PLC transmitters in 6 AC circuit PLC injector 900 is connected to two AC circuits, for example AC circuits 911 and 912 which each include a corresponding circuit breaker, e.g., circuit breakers 970-1 and 970-2. Thus a further description of 6 AC circuit PLC injector 900 will be omitted.

Figure 10:
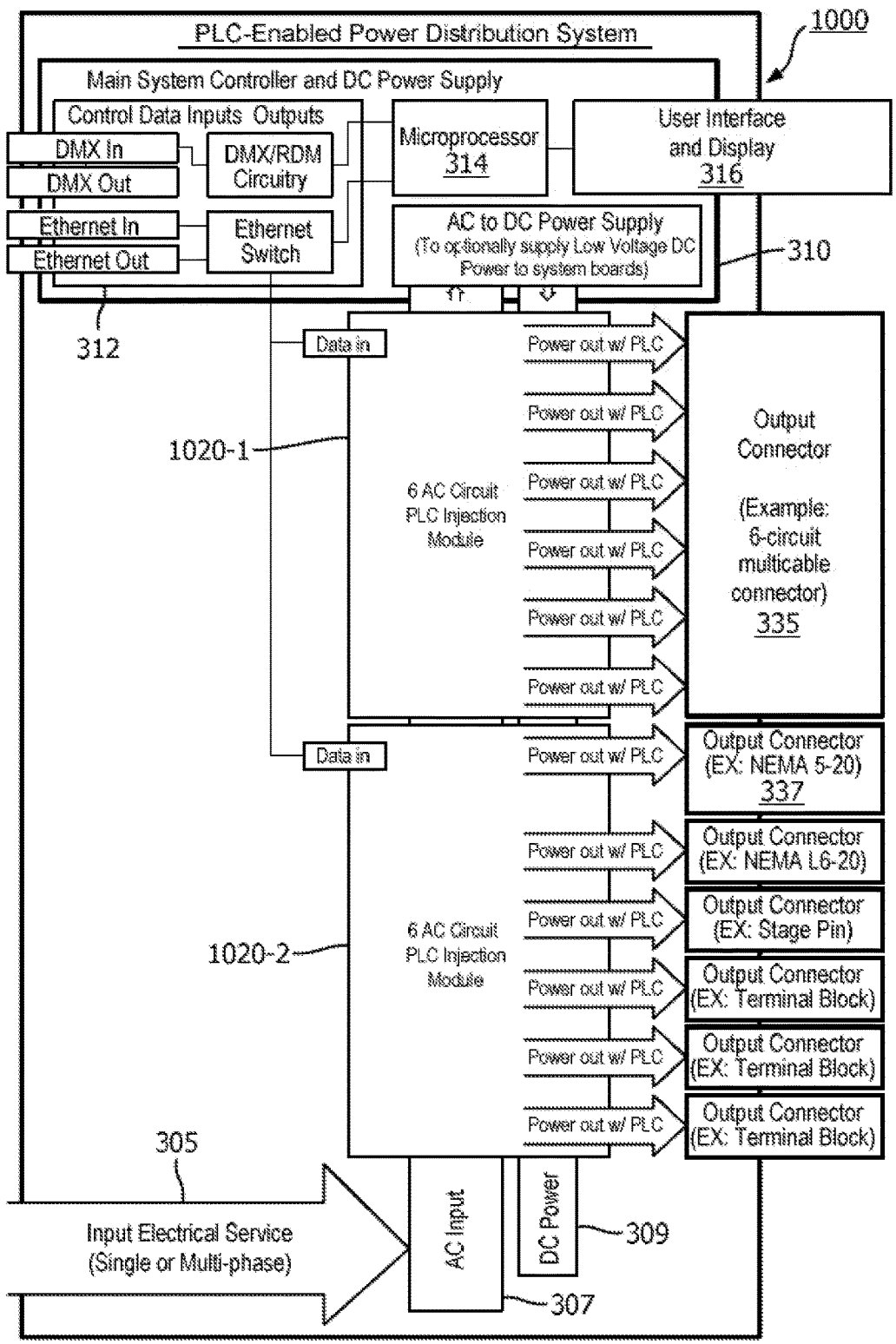
FIG. 10 illustrates another example embodiment of a PLC-enabled power distribution system for typical applications where PLC transmitters are shared across multiple AC circuits.

FIG. 10 illustrates another example embodiment of a PLC-enabled power distribution system 1000 for typical applications where PLC transmitters are shared across multiple AC circuits. Like numbered elements in FIG. 10 may be the same as those in FIG. 3 and FIG. 7 and so a repeated description thereof will be omitted. PLC-enabled power distribution system 1000 is similar to PLC-enabled power distribution system 700, with a primary difference being that PLC-enabled power distribution system 1000 includes a first 6 AC circuit PLC injector 1020-1 and a second 6 AC circuit PLC injector 1020-2. Thus a further description of PLC-enabled power distribution system 1000 will be omitted. In some embodiments, PLC-enabled power distribution system 1000 may be mounted in a single cabinet or rack.

Figure 11:
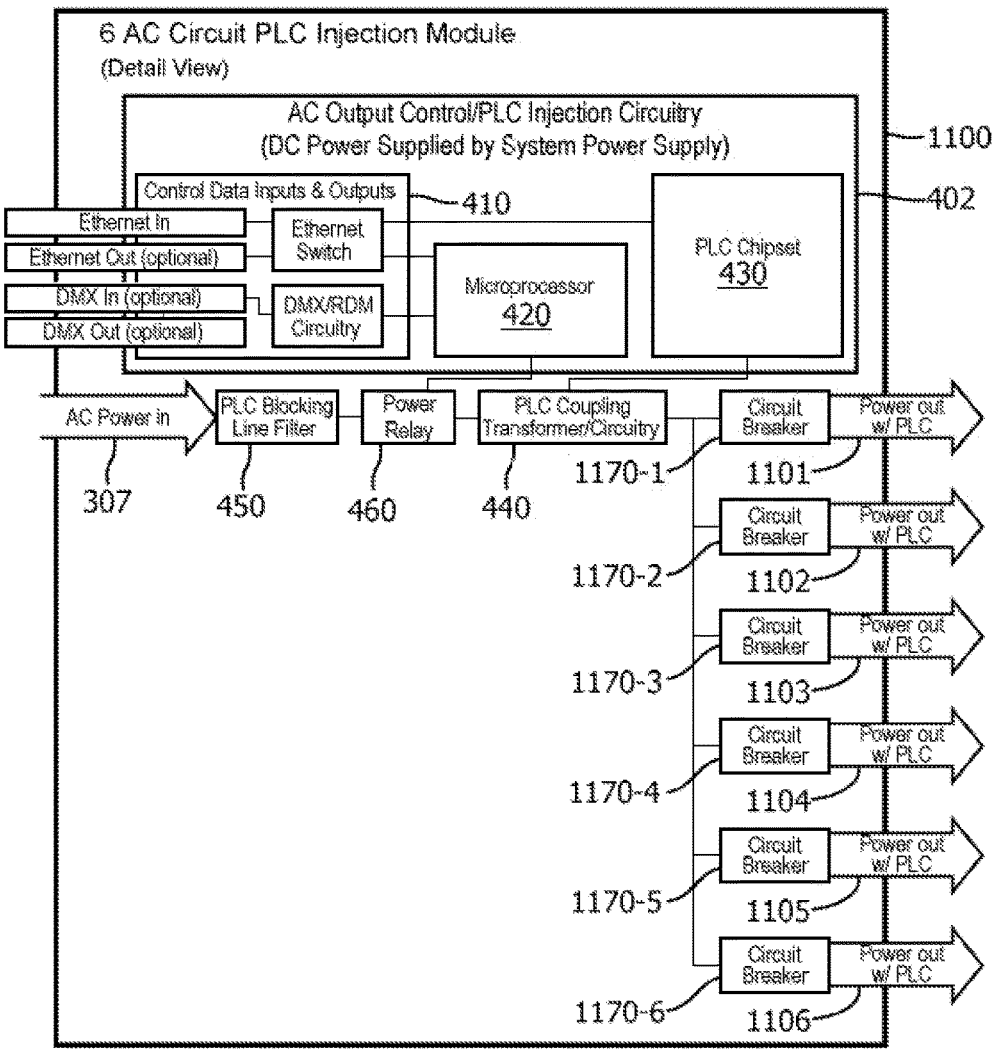
FIG. 11 illustrates a 6 AC circuit PLC injector with 1 PLC transmitter for cost-sensitive applications with low-bandwidth requirements.

FIG. 11 illustrates a 6 AC circuit PLC injector 1100 with one PLC transmitter supporting six AC circuits for cost-sensitive applications with low-bandwidth requirements. 6 AC circuit PLC injector 1100 may be employed as 6 AC circuit PLC injector 720-2 in PLC-enabled power distribution system 1000 or as 6 AC circuit PLC injector 720-1 in PLC-enabled power distribution system 700 and/or PLC injector 1020-2 in PLC-enabled power distribution system 1000.

FIG. 12 illustrates a 6 AC circuit breakout device 1200 with one PLC receiver. Device 1200 is connected to six PLC-enabled AC circuits 411, 412, 413, 414, 415 and 416, and supplies six output AC power connections 607, 1208, 1209, 1210, 1211 and 1212. A single PLC receiver comprising AC Input/PLC extraction circuitry 602 (including data input/output connection(s) 610, a microprocessor 620, a PLC chipset 630, and a user interface 650) and PLC coupling transformer/circuitry 640 couples PLC data to and/or from AC circuit 411 similarly to PLC receiver 600, described above. Like number elements in FIG. 12 and FIG. 6 may be the same as each other, and therefore a repeated description thereof will be omitted.

With PLC-enabled power distribution system 300, PLC-enabled power distribution system 700, PLC-enabled power distribution system 1000, or a similar PLC-enabled power distribution system, PLC data can couple or "jump" from one AC circuit to another AC circuit if wiring is in close proximity. For this reason, beneficially each PLC transmitter of PLC-enabled power distribution systems 300, 700 and 1000 may be configured to have a unique PLC network ID/security code. In that case, a power relay (e.g., power relay 460) for each PLC transmitter allows microprocessor 314, for example, to command all AC circuits except for the AC circuit(s) connected to a single PLC transmitter to be switched OFF or disabled at a given time during a process of PLC enabled device discovery. This allows the PLC-enabled power distribution system to be sure that any remaining PLC enabled devices (e.g., PLC receivers) that it discovers are connected to the particular PLC transmitter which remains enabled or turned ON. The discovered PLC enabled devices then can be programmed with a particular PLC network ID/security ID or code that matches that of the PLC chipset (e.g., PLC chipset 430) of the PLC transmitter for the associated AC circuit(s) which is/are enabled or ON at that time.

PLC Network ID Discovery and Resetting

The PLC networking technology used may permit the configuration of a virtually unlimited number of network IDs. Once the PLC network ID of a PLC receiver (e.g., PLC receiver 600) or PLC receiver module (e.g., PLC receiver module 500) has been changed from a default value, it may not be possible to reconfigure the PLC receiver or PLC receiver module remotely without knowing the exact network ID to which it was previously configured. PLC receivers and PLC receiver modules may include features such as user interfaces and/or reset buttons for programming the PLC network ID and/or resetting it to the default value. However in some embodiments, PLC network ID discovery methods disclosed herein may make these features optional.

Remote PLC network ID discovery can be accomplished using various methods. Three example embodiments of these methods are described below.

According to a first method, PLC network ID resetting requires PLC receivers and PLC receiver modules to reconfigure their own PLC network IDs to a default PLC Network ID if they do not receive any communication from a PLC transmitter (e.g., Single AC Circuit PLC injection module 400) within a predetermined period of time after start up or power up. In that case, in some embodiments of PLC-enabled power distribution systems 300, 700 and 1000, during normal operation, the PLC transmitters may send data packets periodically to keep properly-configured PLC receivers and PLC receiver modules from resetting their PLC network IDs to a default PLC network ID after they have been configured.

According to a second method for PLC network ID discovery, the virtually infinite number of possible PLC network IDs is limited by PLC-enabled power distribution system 300, 700 or 1000 to a manageable list. With a finite list of network IDs, a control system (e.g., of main system controller and DC power supply 310) can discover and re-configure all connected PLC-enabled devices by discovering the PLC receivers and PLC receiver modules configured with each possible network ID, sequentially. This discovery process could be accomplished automatically using a software tool that follows a procedure such as the following (in this example, the discovered PLC enabled devices are reconfigured to the default PLC network ID):

Configure a PLC transmitter to have a first PLC network ID among the finite list of possible PLC network IDs allowed by the PLC-enabled power distribution system.

Discover any PLC receivers and PLC receiver modules which are configured to the first PLC network ID.

Change the PLC network IDs of any discovered PLC enabled devices to the default PLC network ID.

Repeat the above steps for each PLC network ID in the finite list of possible PLC network IDs.

In some embodiments, this process may be repeated for one or more additional PLC transmitters in the PLC-enabled power distribution system, for example for all of the PLC transmitters in the PLC-enabled power distribution system.

After resetting the PLC network IDs to the default PLC network ID, the PLC enabled devices can each then be assigned an appropriate new PLC network ID from the finite list of possible IDs. It is worth noting that it would also be possible to assign a different (non-default) PLC network ID to discovered PLC enabled devices as part of the process above (rather than first setting the PLC network ID to the default PLC network ID). While this approach seems simpler, it may require measures that would make it more time consuming in systems with many AC circuits (where crosstalk between the AC output wiring from different circuits is most likely).

A third method for PLC network ID resetting depends on the ability to send broadcast PLC commands to be received by all PLC enabled devices, regardless of PLC network ID. If the chosen PLC technology supports this capability, then a PLC transmitter can send a global command to tell all PLC receivers and PLC receiver modules to reset their PLC network IDs to the default PLC network ID.

Assigning PLC Network IDs

Beneficially, a system (e.g., PLC-enabled power distribution system 300) may be configured such that all PLC enabled devices (e.g., PLC receiver and PLC receiver modules) connected to a particular AC circuit are assigned the same PLC network ID as the PLC transmitter (e.g., Single AC Circuit PLC injection module 400) associated with the particular AC circuit to which they are connected. Beneficially, each PLC transmitter (e.g., Single AC Circuit PLC injection module 400) in the system PLC-enabled power distribution system 300 may be assigned a unique PLC network ID for normal operation.

Before assigning PLC network IDs to PLC enabled devices in a system for a particular application (e.g., when all PLC enabled devices may be configured with the default PLC network ID), it is possible that the total number of PLC enabled devices in the system may exceed the limits of the PLC technology. In the case, the PLC blocking line filter (e.g., PLC blocking line filter 460) of each PLC transmitter will prevent PLC communication from one PLC transmitter from traveling back through the AC input 307 and interfering with other PLC transmitters directly. However, as noted above it is still possible for PLC data or communications to couple or "jump" from one AC circuit to another. Cables are routinely routed in bundles and in some cases PLC signals could easily be coupled from one cable to another. In general, it is to be expected that the impact of this cable-to-cable interference would be much less significant once the system is properly configured with unique PLC network IDs assigned to each PLC transmitter and associated PLC enabled devices, but this interference could potentially make the system configuration process difficult or unpredictable. To address this, in some embodiments the PLC-enabled power distribution system includes at least one power relay (e.g., power relay 460) for each PLC transmitter which can be used to isolate PLC enabled devices until they are each configured with an appropriate PLC network ID.

PLC network IDs can be assigned using various processes. In some embodiments, PLC receivers and PLC receiver modules that are fitted with on-board user interfaces may be manually configured by a user or operator. Various alternative procedures exist should the user prefer to have the system configure the PLC network IDs of the PLC receivers and PLC receiver modules automatically and remotely. Two example embodiments of these procedures are described below.

Procedure 1 for assigning PLC network IDs involves starting with all PLC enabled devices set to the default PLC network ID, for example by one of the methods described above. This procedure may employ the power relays (e.g., power relay 460) in the PLC transmitters of PLC-enabled power distribution system 300. The power relays allow PLC-enabled power distribution system 300 to disable or turn OFF power to all AC circuits except those associated with a particular PLC transmitter. Once the AC circuits associated with all but one PLC transmitter are OFF or disabled, then it can be assured that all discovered PLC enabled devices are connected to the AC circuit(s) which is/are still powered ON or enabled. The PLC enabled devices that remain powered ON can then be configured with a particular assigned PLC network ID. Once all PLC enabled devices connected to a particular PLC transmitter are configured, the PLC network ID of that particular PLC transmitter can also be changed to the particular assigned PLC network ID. At this point, the system can use the power relay to switch ON power to the next PLC transmitter's AC circuit(s) and repeat the process for each other PLC transmitter. Beneficially, it may not be necessary to switch OFF power to a particular PLC transmitter's AC circuit(s) once it and the other PLC enabled devices connected to its AC circuit(s) have been configured with their particular assigned PLC Network ID.

Procedure 2 for assigning PLC network IDs may build off of Method 1 for PLC network ID resetting, described above. In some embodiments, upon system start-up, PLC-enabled power distribution system 300 may use the power relays associated with each PLC transmitter to switch ON the AC circuit(s) associated with each PLC transmitter sequentially, with a short delay between switching ON the AC circuit(s) for one PLC transmitter and switching ON the AC circuit(s) for the next PLC transmitter. Counters in PLC-enabled power distribution system 300 and each of the PLC receivers and PLC receiver modules may keep track of the time which has elapsed since power was turned ON. PLC-enabled power distribution system 300 can then assign PLC network IDs by sending broadcast PLC packets instructing all PLC receivers and PLC receiver modules which have been ON for a particular amount of time (with an appropriate amount of tolerance) to change their PLC network ID to a particular assigned PLC network ID. PLC-enabled power distribution system 300 can send a broadcast packet like this for each PLC Network ID (ideally one for each PLC transmitter in PLC-enabled power distribution system 300) until all of the PLC enabled devices connected to PLC-enabled power distribution system 300 are configured. After the PLC enabled devices connected to each PLC transmitter are configured, the PLC transmitter can change its own PLC network ID from the default PLC Network ID to one that matches the PLC enabled devices connected to its AC circuit.

In applications with very long cable lengths, PLC receivers and PLC receiver modules which are located far from their associated PLC transmitter may not receive PLC signals reliably. Existing PLC networking standards may not allow the use of PLC repeaters on one PLC network.

Accordingly, to address this issue, as illustrated in FIG. 13, in the case of very long cable lengths, a repeater 1400 may be provided which operates on two separate PLC network IDs.

Figure 14:
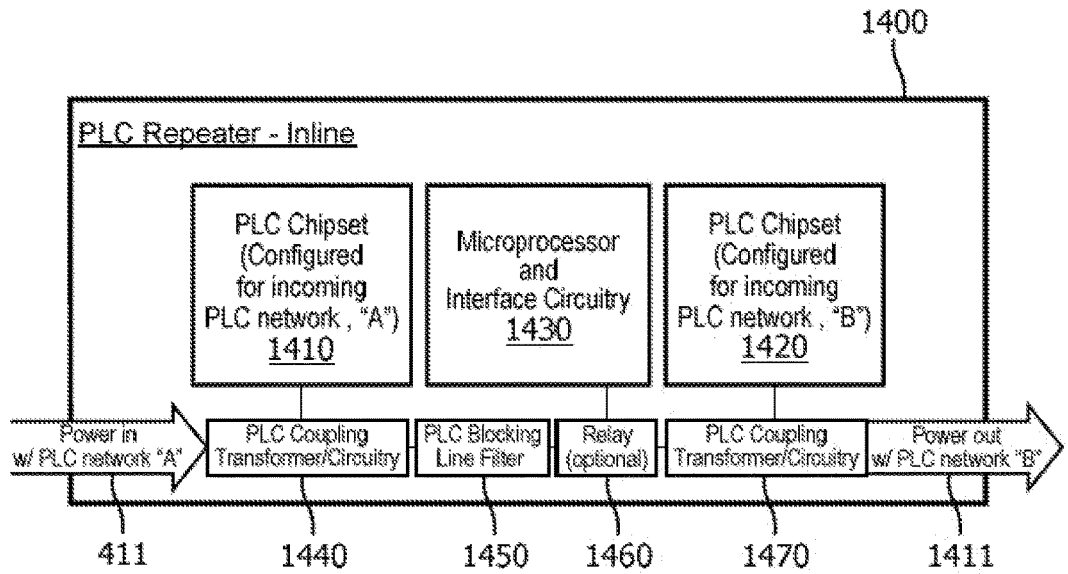
FIG. 14 illustrates an exemplary inline implementation of a PLC repeater.

FIG. 14 illustrates an embodiment of PLC repeater 1400 which operates on two separate PLC network IDs. PLC repeater 1400 is an inline implementation of a PLC Repeater which has an AC power input as an AC circuit 411 with PLC, and an AC power output as an AC circuit 1411 with PLC.

PLC repeater 1400 comprises a first PLC chipset 1410, a second PLC chipset 1420, a microprocessor and interface circuitry 1430, first PLC coupling transformer/circuitry 1440, a PLC blocking line filter 1450, an optional power relay 1460, and second PLC coupling transformer/circuitry 1470. PLC chipsets, PLC coupling transformer/circuitry, PLC blocking line filters, and power relays have been described above and a repeated description thereof will be omitted.

Operationally, first PLC chipset 1410 operates with first PLC coupling transformer 1440 to communicate PLC data with one PLC network ("A") having a first PLC network ID, while second PLC chipset 1420 operates with second PLC coupling transformer 1470 to communicate PLC data with a second PLC network ("A") having a second PLC network ID.

In particular, PLC repeater 1400 may permit PLC data received on PLC network A by first PLC chipset 1410 and first PLC coupling transformer 1440 to be supplied to microprocessor 1430 from which it is then provided to second PLC chipset 1420 and transmitted onto PLC network B by second PLC chipset 1420 and second PLC coupling transformer 1470. PLC networks A and B are separated from each other by PLC blocking line filter 1450 and optional power relay 1460. PLC blocking line filter 1450 helps preserve bandwidth by substantially reducing the overlap of the signals from the two PLC networks. Power relay 1460 may be included to allow the output power to be switched ON and OFF. Power relay 1460 may allow PLC repeater 1400 to support the automatic Network ID resetting and configuration processes described above.

Figure 15:
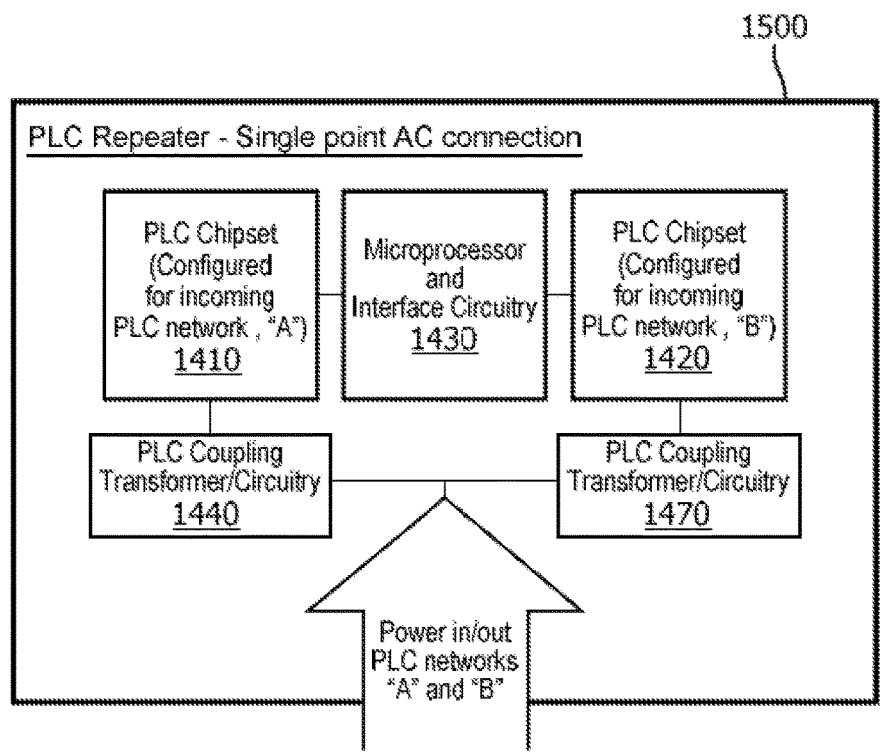
FIG. 15 illustrates an exemplary implementation of a PLC repeater with single-point AC power connection.

FIG. 15 illustrates a PLC repeater 1500 with a single AC power connection over which PLC data is received and transmitted. Internally, PLC repeater 1550 includes the same elements as inline PLC repeater 1400 with the exception of PLC blocking line filter 1450 and power relay 1460. Compared to inline PLC repeater 1400, PLC repeater 1500 may have fewer features but may be less expensive.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A system, comprising:
   at least one AC circuit power line communication (PLC) injection module, the AC circuit PLC injection module comprising:
   an AC power input configured to receive an AC power signal;
   a PLC transceiver circuit configured to couple a PLC signal onto the AC power signal;
   at least a first AC circuit output configured to output AC power and the PLC signal;
   a PLC blocking line filter configured to filter the PLC signal from passing to the AC power input;
   a power relay connected between the AC power input and the at least one AC circuit output; and
   a processor programmed to control the power relay to selectively enable the first AC circuit output to output power as a result of a process assigning a PLC network ID to the at least one AC circuit PLC injection module, and to open the power relay to disable the first AC circuit output from outputting the AC power, as a result of a process of assigning PLC network IDs to PLC enabled devices which are connected via the AC output circuit to the at least one AC circuit PLC injection module.

2. The system of claim 1, wherein the at least one AC circuit PLC injection module comprises at least a second AC circuit output, each configured to output the AC power and the PLC signal, wherein the first and second AC circuit outputs are isolated from each other by at least one circuit breaker.

3. The system of claim 1, wherein the at least one AC circuit PLC injection module further comprises:
   at least a second AC power input configured to receive the AC power signal;
   at least a second PLC transceiver circuit configured to couple a second PLC signal onto the AC power signal;
   at least a second AC circuit output configured to output AC power and the second PLC signal; and
   at least a second PLC blocking line filter configured to filter the second PLC signal from passing to the second AC power input.

4. The system of claim 3, wherein the PLC transceiver circuit is configured to have a first PLC network ID, and the second PLC transceiver circuit is configured to have a second PLC network ID which is different from the first PLC network ID.

5. The system of claim 1, wherein the at least one AC circuit PLC injection module further comprises:

at least a second AC power input configured to receive a second AC power signal different from the first AC power signal;

at least a second PLC transceiver circuit configured to couple a second PLC signal onto the second AC power signal;

at least a second AC circuit output configured to output AC power and the second PLC signal; and at least a second PLC blocking line filter configured to filter the second PLC signal from passing to the second AC power input.

6. The system of claim 1, wherein the at least one AC circuit PLC injection module includes at least a second AC circuit PLC injection module, wherein the second AC circuit PLC injection module comprises:

a second AC power input configured to receive the AC power signal;

a second PLC transceiver circuit configured to couple a second PLC signal onto the AC power signal;

at least a second AC circuit output configured to output AC power and the second PLC signal; and a second PLC blocking line filter configured to filter the second PLC signal from passing to the second AC power input.

7. The system of claim 6, wherein the PLC transceiver circuit is configured to have a first PLC network ID, and the second PLC transceiver circuit is configured to have a second PLC network ID which is different from the first PLC network ID.

8. The system of claim 7, further comprising:

at least a first PLC receiver connected to the first AC circuit output and configured to receive the PLC signal therefrom; and at least a second PLC receiver connected to the second AC circuit output and configured to receive the second PLC signal therefrom;

wherein the first PLC receiver is configured to have the first PLC network ID and the second PLC receiver is configured to have the second PLC network ID.

9. The system of claim 1, further comprising a PLC repeater connected at some point between the first AC circuit output and at least one PLC receiver;

wherein the PLC transceiver circuit is configured to have a first PLC network ID;

wherein the at least one PLC receiver is configured to have a second PLC network ID which is different from the first PLC network ID; and wherein PLC data is communicated between the PLC transceiver circuit and the PLC receiver via the PLC repeater.

10. For a PLC-enabled power and data distribution system having a plurality of PLC transmitters connected to a plurality of PLC enabled devices via a plurality of AC circuits each associated with one of the PLC transmitters, a method, comprising:

setting PLC network IDs for each of the plurality of PLC enabled devices to a default PLC network ID; and after each of the plurality of PLC enabled devices has been set to the default PLC network ID, assigning each of the plurality of PLC enabled devices connected to each one of the PLC transmitters to a PLC network ID uniquely assigned that one PLC transmitter, comprising:

turning OFF power to all AC circuits except those associated with a first PLC transmitter;

configuring any PLC enabled devices that remain powered ON with a first unique PLC network ID;

configuring the first PLC transmitter to have the first unique PLC network ID.

11. The method of claim 10, wherein setting the PLC network IDs for each of the plurality of PLC enabled devices to the default network ID comprises:

(1) configuring a selected one of the PLC transmitters to a have selected PLC network ID among a finite list of possible PLC network IDs employed by the PLC-enabled power and data distribution system;

(2) discovering any PLC enabled devices connected to the selected PLC transmitter which are configured to the selected PLC network ID;

(3) changing the PLC network IDs of any discovered PLC enabled devices to the default PLC network ID; and (4) repeating steps (1) through (3) for each PLC network ID among a finite list of possible PLC network IDs.

12. The method of claim 10, further comprising:

turning OFF power to all AC circuits except those associated with the first PLC transmitter and a second PLC transmitter;

configuring any PLC enabled devices that remain powered ON with a second unique PLC network ID;

configuring the second PLC transmitter to have the second unique PLC network ID.

13. The method of claim 10, wherein setting PLC network IDs for each of the plurality of PLC enabled devices to a default PLC network ID comprises each of the plurality of PLC enabled devices automatically setting its PLC network ID to the default PLC network ID when it does not receive any PLC signal from a PLC transmitter within a predetermined period of time after it is powered up.

14. The method of claim 13, wherein assigning each of the plurality of PLC enabled devices connected to each one of the PLC transmitters to a PLC network ID uniquely assigned that one PLC transmitter comprises:

turning ON all AC circuits associated with each PLC transmitter sequentially, with a delay interval between switching ON AC circuit(s) associated with one PLC transmitter and switching ON the AC circuit(s) for a next PLC transmitter;

tracking at the PLC-enabled power distribution system and at each of the PLC enabled devices a time which has elapsed since power was turned ON;

transmitting one or more first broadcast PLC packets instructing all enabled devices which have been ON for a first amount of time to change their PLC network ID to a first unique PLC network ID; and transmitting one or more additional broadcast PLC packets instructing all PLC enabled devices which have been ON for each of a plurality of additional different amounts of time to change their PLC network ID to a corresponding unique PLC network ID unto each of the plurality of PLC enabled devices connected to each one of the PLC transmitters is assigned to a PLC network ID uniquely assigned that one PLC transmitter.

15. The method of claim 10, wherein setting PLC network IDs for each of the plurality of PLC enabled devices to a default PLC network ID comprises one of the PLC transmitters broadcasting a global command capable of being received by all of the PLC enabled devices, regardless of their assigned PLC network ID, wherein the global command instructs all of the PLC enabled devices to reset their PLC network IDs to the default PLC network ID.

* * * * *